United States Patent [19]

Onoda et al.

[11] Patent Number: 4,916,368
[45] Date of Patent: Apr. 10, 1990

[54] CONTROLLING METHOD AND DEVICE FOR PERMANENT MAGNET SYNCHRONOUS MOTOR

[75] Inventors: Yoshimitsu Onoda, Tokyo; Takato Yamakoshi, Matsudo, both of Japan

[73] Assignee: Hitachi Elevator Engineering & Service Company, Ltd., Tokyo, Japan

[21] Appl. No.: 270,808

[22] Filed: Nov. 14, 1988

[30] Foreign Application Priority Data

Nov. 14, 1987 [JP] Japan ............................... 62-286441

[51] Int. Cl.$^4$ ........................ H02K 19/10; H62P 5/40
[52] U.S. Cl. ..................................... 318/723; 318/798
[58] Field of Search ............... 318/800, 805, 721–723, 318/798, 806

[56] References Cited

U.S. PATENT DOCUMENTS 4,629,958 12/1986 Kurakake et al. ................. 318/723
4,649,331 3/1987 Jahns ................................. 318/806

OTHER PUBLICATIONS

Leonhard, W., *Control of Electrical Drives*, Springer Verlag, 1985, pp. 260–270.

*Primary Examiner*—David Smith, Jr.
*Attorney, Agent, or Firm*—Oblon, Spivak, McClelland, Maier & Neustadt

[57] ABSTRACT

A controlling device for a permanent magnet synchronous motor wherein a permanent magnet is used as a rotor and which includes three-phase armature windings comprises a detecting means for detecting a rotational position and a rotational angle of said rotor, a comparison means for comparing the rotational speed detected by said detecting means with a predetermined reference speed and for developing a value of a difference between the rotational speed and the reference speed, a converting means for determining currents to be supplied individually to said armature windings in response to a vector value obtained from the rotational position detected by said detecting means and the value of the difference delivered from said comparison means, and a current controlling means for controlling current flows through said individual armature windings in response to values obtained by said converting means.

8 Claims, 6 Drawing Sheets

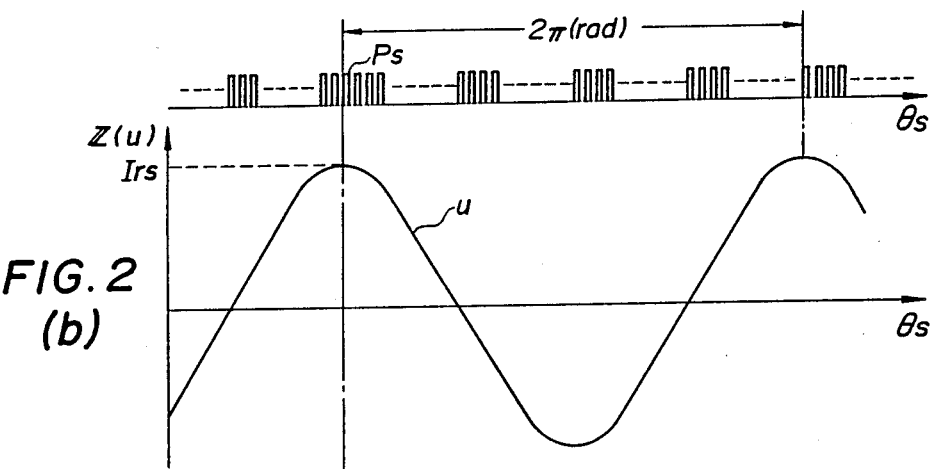
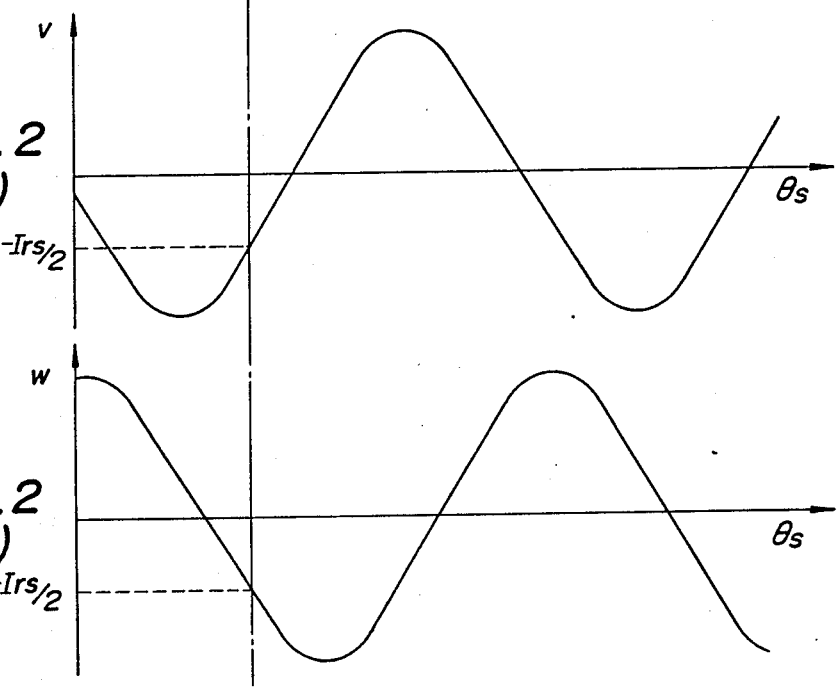

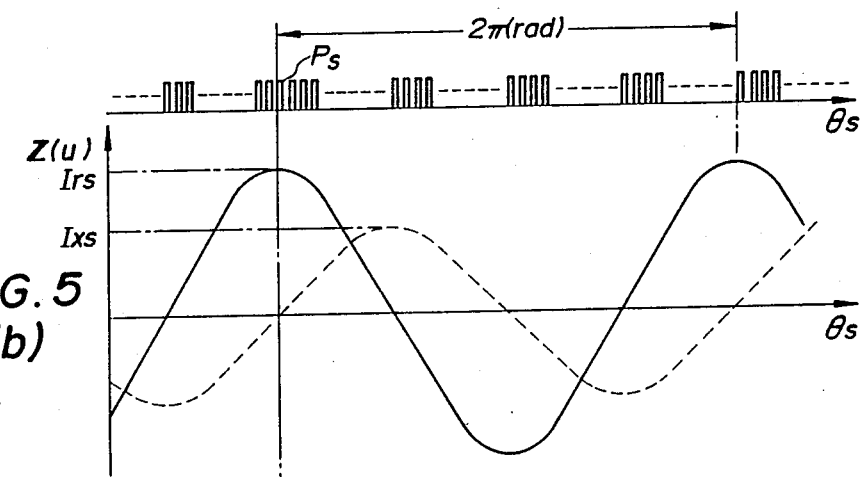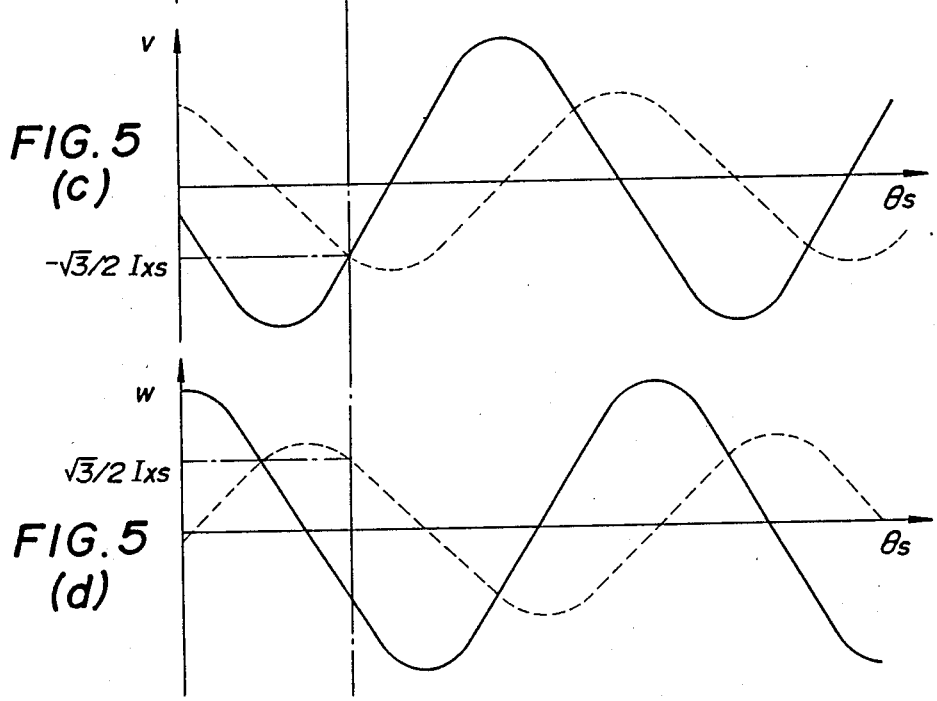

CONTROLLING METHOD AND DEVICE FOR PERMANENT MAGNET SYNCHRONOUS MOTOR

BACKGROUND OF THE INVENTION (1) Field of the Invention

This invention relates to a controlling method and device for controlling driving of a permanent magnet synchronous motor wherein a permanent magnet is used as a rotor.

(2) Description of the Prior Art

A permanent magnet synchronous motor is a motor of such a construction that a permanent magnet is used as a rotor and ac currents are supplied to armature windings to form a rotating magnetic field in order to cause the rotor to rotate. General construction of a permanent magnet synchronous motor of such a construction and a controlling device for the motor will be described with reference to the drawings.

FIG. 7 is a circuit diagram of a conventional controlling device for a permanent magnet synchronous motor. Referring to FIG. 7, a permanent magnet synchronous motor M is composed of a permanent magnet 1 and three armature windings 2U, 2V and 2W. Three-phase ac currents are supplied to the armature windings 2U, 2V and 2W. In particular, electric currents $I_U$, $I_V$ and $I_W$ of the U, V and W phases are supplied to the armature windings 2U, 2V and 2W, respectively. A three-phase ac power source 3 is provided for driving the permanent magnet synchronous motor M. A rectifier circuit 4 constituted from six transistors Tr rectifies three-phase ac currents of the power source 3 into dc currents. A rectifier controlling circuit 5 develops a controlling signal for each of the transistors Tr, and in response to controlling signals from the rectifier controlling circuit 5, appropriate rectification of the three-phase ac currents is effected. An invertor circuit 6 composed of six parallel circuits each including a transistor Tr and a diode D converts dc currents rectified by the rectifier circuit 4 into three-phase ac currents. An invertor controlling circuit 7 develops a controlling signal for each of the transistors Tr of the invertor circuit 6. A circuit consisting of the power source 3, rectifier circuit 4, rectifier controlling circuit 5, invertor circuit 6 and invertor controlling circuit 7 will be hereinafter referred to as an invertor device which is generally denoted by a reference numeral 8.

With the controlling device for a permanent magnet synchronous motor described above, if predetermined controlling signals are developed from the rectifier controlling circuit 5 and the invertor controlling circuit 7, corresponding three-phase currents are supplied to the armature windings 2U, 2V and 2W, and a rotating magnetic field is formed by the currents of the individual phases. As the rotating magnetic field is generated, the permanent magnet 1 is rotated by and in synchronism with the rotating magnetic field.

Such a permanent magnet synchronous motor as described above has significant advantages that, since a permanent magnet is employed used as a rotor, it requires no exciting power and accordingly the power consumption is remarkably low comparing with some other motor of the same capacity such as, for example, an induction motor, and that, since it requires no slip ring nor brush, it seldom suffers from a trouble or loss.

While a permanent magnet synchronous motor has such advantages as described just above, it has following problems. In particular, it is a common case that, as the time of use passes, a permanent magnet loses its magnetomotive force and is demagnetized gradually. This will be described with reference to characteristic curves of permanent magnets shown in FIG. 8. Referring to FIG. 8, the axis of abscissa represents coercive force while the axis of ordinate represents magnetic flux density. A permanent magnet used in a permanent magnet synchronous motor normally has a magnetic flux density as high as possible so that it may not lead to shortage of a turning effect. However, a permanent magnet which has a high magnetic flux density naturally has a small coercive force. In particular, referring to FIG. 8, a permanent magnet having a magnetic flux density $B_{m1}$ has a coercive force $H_{c1}$, but the coercive force $H_{c2}$ of another permanent magnet having a magnetic flux density $B_{m2}$ lower than the magnetic flux density $B_{m1}$ is greater than the coercive force $H_{c1}$. From this reason, a permanent magnet having a high magnetic flux density must be used for such an apparatus as a permanent magnet synchronous motor for which a considerably high turning effect is required. Besides, since such a permanent magnet presents a small coercive force, demagnetization thereof cannot be avoided after all.

Further, demagnetization is caused not only by such aging. During driving of a motor, such an instant frequently occurs that a north pole and a south pole of a permanent magnet are opposed to a north pole and a south pole, respectively, of a magnetic field generated by armature windings 2U, 2V and 2W, which also will cause demagnetization of the permanent magnet.

Meanwhile, if a heavy load is applied to the permanent magnet synchronous motor, the permanent magnet synchronous motor may be stepped out. In such a case, if such a condition takes place that rotation of the permanent magnet is stopped due to the relation to the load then, such a positional relationship between the magnetic poles of the permanent magnet and the magnetic field by the armature windings as described above may be maintained for a long period of time. Consequently, the permanent magnet may be demagnetized to a significant degree, and in an extreme case, there is the possibility that the permanent magnet may be completely demagnetized.

In this manner, a permanent magnet synchronous motor cannot be free from partial or complete demagnetization, and such partial or complete demagnetization will give rise to shortage or disappearance of a turning effect of the permanent magnet synchronous motor. This may lead to a problem that the permanent magnet synchronous motor cannot rotate itself at all. This problem naturally depreciates the reliability of a permanent magnet synchronous motor to a remarkable degree. Accordingly, a permanent magnet synchronous motor which lacks in reliability as described just above cannot at all be employed in various equipments of various fields, particularly an equipment of a field for transporting human beings such as an elevator or an escalator while a permanent magnet synchronous motor has such advantages as described hereinabove.

SUMMARY OF THE INVENTION

It is an object of the present invention to provide a controlling device for a permanent magnet synchronous motor which resolves the problems of the prior art described above and wherein partial or complete demagnetization of a permanent magnet can be prevented and incidentally the reliability of the permanent magnet synchronous motor can be improved to a very high level.

In order to attain the object, according to a first aspect of the present invention, a controlling device for a permanent magnet synchronous motor wherein a permanent magnet is used as a rotor and which includes three-phase armature windings comprises a detecting means for detecting a rotational position and a rotational angle of the rotor, a comparison means for comparing the rotational speed detected by the detecting means with a predetermined reference speed and for developing a value of a difference between the rotational speed and the reference speed, a converting means for determining currents to be supplied individually to the armature windings in response to a vector value obtained from the rotational position detected by the detecting means and the value of the difference delivered from the comparison means, and a current controlling means for controlling current flows through the individual armature windings in response to values obtained by the converting means.

According to a second aspect of the present invention, a controlling device for a permanent magnet synchronous motor wherein a permanent magnet is used as a rotor and which includes three-phase armature windings comprises a detecting means for detecting a rotational position and a rotational angle of the rotor, a comparison means for comparing the rotational speed detected by the detecting means with a predetermined reference speed and for developing a value of a difference between the rotational speed and the reference speed, an exciting component generating means for developing an exciting component value having a phase shift of 90 degrees with respect to the value of the difference obtained by the comparison means when the value of the difference exceeds a predetermined value, a converting means for determining currents to be supplied individually to the armature windings in response to a vector value obtained from the rotational position detected by the detecting means and the value of the difference delivered from the comparison means as well as to the rotational position and the exciting component value obtained by the exciting component generating means, and a current controlling means for controlling current flows through the individual armature windings in response to values obtained by the converting means.

With the controlling device for a permanent magnet synchronous motor according the first aspect of the present invention, a rotational speed and a rotational position of the permanent magnet is detected by the detecting means, and the thus detected rotational speed and the predetermined reference speed are compared with each other by the comparison means, and then a value of a difference between the speeds and the detected rotational position of the permanent magnet are delivered to the converting means. The converting means determines, in response to the values delivered thereto, currents to be supplied to the armature windings of the phases U, V and W, and the current controlling means supplies currents to the armature windings of the individual phases U, V and W in response to signals corresponding to the determined currents.

With the controlling device for a permanent magnet synchronous motor according to the second aspect of the present invention, a rotational speed and a rotational position of the permanent magnet is detected by the detecting means, and the thus detected rotational speed and the predetermined reference speed are compared with each other by the comparison means, and then a value of a difference between the speeds and the detected rotational position of the permanent magnet are delivered to the converting means. In this instance, when the value of the difference is greater than the predetermined value, an exciting component value having a phase shift of 90 degrees with respect to the value of the difference is developed from the exciting component generating means, and the exciting component value is also delivered to the converting means. The converting means determines, in response to the values delivered thereto, currents to be supplied to the armature windings of the phases U, V and W and further currents having a phase shift of 90 degrees with respect to the individual currents, and the current controlling means supplies composite currents of the currents of the individually corresponding phases to the armature windings of the individual phases U, V and W in response to signals corresponding to the individual determined currents.

A specific embodiment of the present invention will now be described in detail by way of example with reference to the accompanying drawings.

BRIEF DESCRIPTION OF THE DRAWINGS

FIGS. 2(a), 2(b), 2(c) and 2(d) are waveform diagrams showing signals at several portions of the device shown in FIG. 1;

FIGS. 5(a), 5(b), 5(c) and 5(d) are waveform diagrams similar to FIGS. 2(a), 2(b), 2(c) and 2(d) but additionally showing waveforms of imaginary number portions of signals at the same portions of the device shown in FIG. 1;

DETAILED DESCRIPTION OF THE ILLUSTRATED EMBODIMENT

Figure 1:
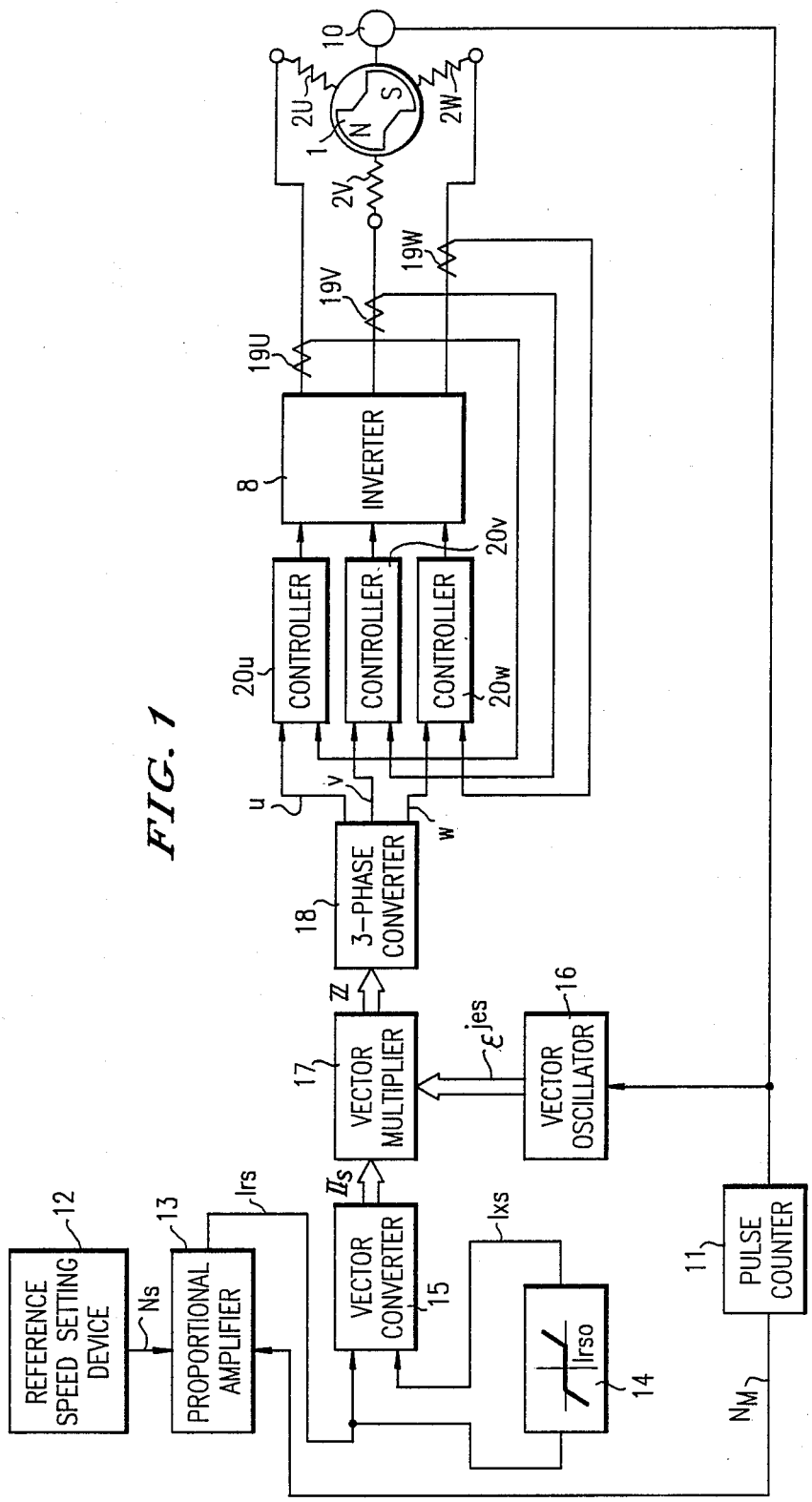
FIG. 1 is a block diagram of a controlling device for a permanent magnet synchronous motor showing a preferred embodiment of the present invention.
Figure 7:
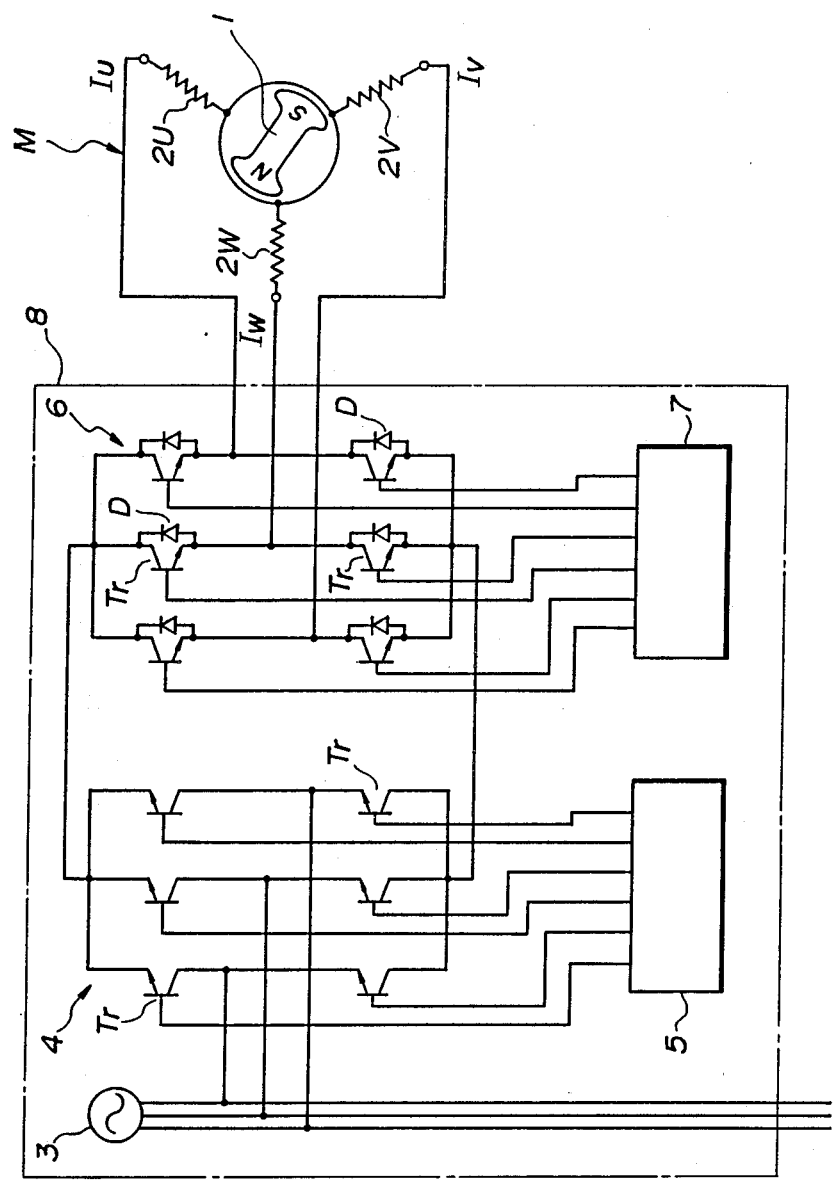
FIG. 7 is a circuit diagram showing a conventional controlling device for a permanent magnet synchronous motor.
Figure 8:
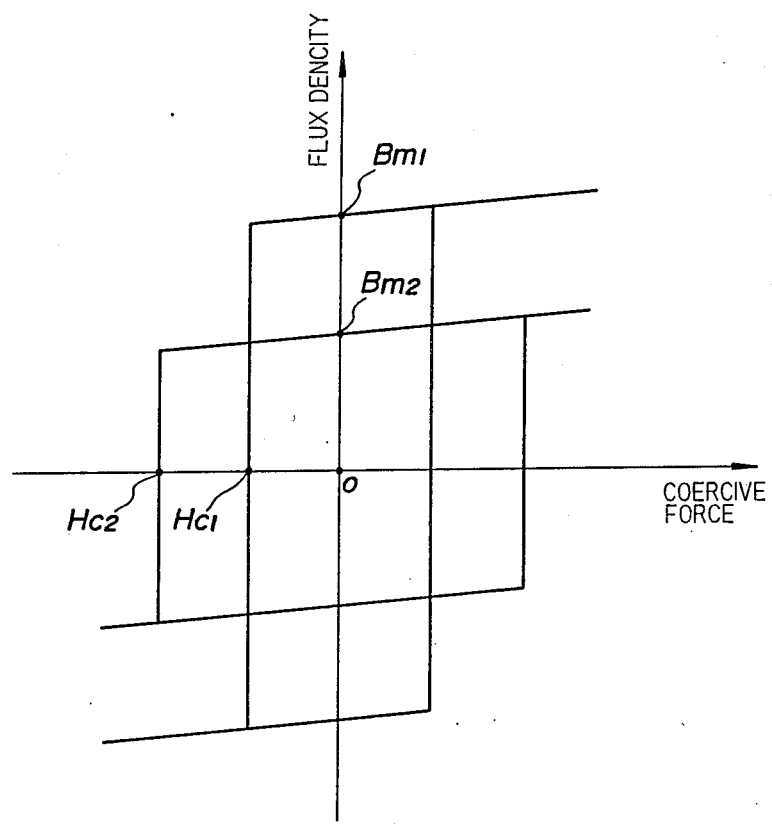
FIG. 8 is a characteristic diagram illustrating relationships between magnetic flux density and coercive force of permanent magnets.

FIG. 1 is a block diagram of a controlling device for a permanent magnet synchronous motor according to a preferred embodiment of the present invention. Referring to FIG. 1, like reference numerals denote like parts to those shown in FIG. 7, and overlapping description thereof will be omitted herein. The controlling device shown includes a pulse generator 10 which is connected to a permanent magnet 1 serving as a rotor and develops a train of pulses the number of which increases in proportion to a rotational angle of the permanent magnet 1. For example, if it is assumed that a pulse is developed each time the permanent magnet 1 is rotated by one degree, a total of 360 pulses are developed for one complete rotation of the permanent magnet 1. A pulse counter 11 counts output pulses of the pulse generator 10, and as it counts pulses, it develops a signal $N_M$ which increases in proportion to a rotational frequency of the permanent magnet 1 per unit time (a speed of the permanent magnet synchronous motor). A reference speed setting device 12 is provided for setting therethrough a desired speed of the permanent magnet synchronous motor M as a reference speed, and a signal $N_S$ which increases in proportion to the reference speed thus set is outputted from the reference speed setting device 12. A proportional amplifier 13 compares the signal $N_S$ developed from the reference speed setting device 12 and the signal $N_M$ developed from the pulse counter 11 with each other and amplifies and outputs a value of a difference between the signals. A signal which is developed from the proportional amplifier 13 and increases in proportion to the value of the difference is represented by $I_{rs}$. A function generator 14 receives the output signal $I_{rs}$ of the proportional amplifier 13. When the value of the signal $I_{rs}$ exceeds a predetermined value $I_{rsO}$, the function generator 14 develops a signal $I_{XS}$ in accordance with a signal corresponding to an amount exceeding the signal $I_{XS}$. It is to be noted that the proportional amplifier 13 can be replaced by a proportional integrating amplifier.

A vector converter 15 receives the output signal $I_{rs}$ of the proportional amplifier 13 and the output signal $I_{XS}$ of the function generator 14 and converts them into a vector. A vector signal developed from the vector converter 15 is represented as a signal $\mathbb{I}_S$. A vector oscillator 16 receives pulses from the pulse generator 10 and delivers them as a vector signal $e^{j\theta s}$ indicative of a rotational angle (rotational position) of the permanent magnet 1. In particular, the vector oscillator 16 has a function to add or accumulate a unit angle each time a pulse is received and to successively output an integrated value thereof. The integrated value is reset each time the permanent magnet 1 is rotated for one complete rotation. A vector multiplier 17 multiplies the vector signal $\mathbb{I}_S$ developed from the vector converter 15 by the vector signal $e^{j\theta s}$ developed from the vector oscillator 16, and the vector multiplier 17 develops a thus multiplied vector signal $\mathbb{Z}$. A three-phase converter 18 determines, in response to the output signal $\mathbb{Z}$ of the vector multiplier 17, currents to be supplied to the armature windings 2U, 2V and 2W of the individual phases of the permanent magnet synchronous motor M. The three-phase converter 18 develops signals u, v and w which increase in proportion to the individual phase currents. Details of functions of the vector converter 15, vector oscillator 16, vector multiplier 17 and three-phase converter 18 will become apparent from the description of operation given below.

Three current detectors 19U, 19V and 19W detect current flows through the armature windings 2U, 2V and 2W, respectively, and develop signals which increase in proportion to the detected currents. Three controllers 20u, 20v and 20w receive the signals u, v and w developed from the three-phase converter 18 and signals detected by the current detectors 19U, 19V and 19W, respectively, in order to effect feedback control. Output signals of the individual controllers 20u, 20v and 20w are coupled to the invertor controlling circuit 7 for the invertor device 8, and in response to controlling signals from the invertor controlling circuit 7, currents which increase in proportion to the signals u, v and w from the three-phase converter 18 are supplied to the individual armature windings 2U, 2V and 2W.

In the following, operation of the present embodiment will be described. At first, a desired speed is set at the reference speed setting device 12, and a signal $N_S$ corresponding to the set speed is developed from the reference speed setting device 12. After the permanent magnet synchronous motor M is energized, as the permanent magnet 1 is rotated, a pulse is developed successively from the pulse generator 10 each time the pulse generator 10 is rotated by a unit angle. Such pulses are delivered to the pulse counter 11 and the vector oscillator 16. The pulse counter 11 thus develops a signal $N_M$ which increases in proportion to the rotational speed of the permanent magnet 1 in response to the pulses. The proportional amplifier 13 calculates a difference between the signals $N_S$ and $N_M$ and develops a signal $I_{rs}$ corresponding to the difference.

By the way, a reference speed is set at the reference speed setting device 12 naturally within a range of the performance of the permanent magnet synchronous motor M. The permanent magnet synchronous motor M thus rotates, in a normal condition, at a speed near the set reference speed. Accordingly, the output signal $I_{rs}$ of the proportional amplifier 13 is small and has a value smaller than the predetermined value $I_{rsO}$ set at the function generator 14. Thus, operation in such a normal condition of the permanent magnet synchronous motor M will be described at first in the following.

Since in this instance the output signal $I_{XS}$ of the function generator 14 is 0, only the signal $I_{rs}$ is delivered to the vector converter 15, and as an output signal $\mathbb{I}_S$ of the vector converter 15, the signal $I_{rs}$ making a real number portion of a vector is outputted as it is. It is to be noted that, while an imaginary number portion of the vector is constituted by the output signal $I_{XS}$ of the function generator 14, this will be described in the description of operation when the permanent magnet synchronous motor M is in an abnormal condition.

Meanwhile, the vector oscillator 16 receives output pulses of the pulse generator 10. The output pulses are illustrated in FIG. 2(a). Referring to FIG. 2(a), the axis of abscissa represents a rotational angle $\theta_s$ of the permanent magnet 1. Since the pulse generator 10 develops a pulse each time the permanent magnet 1 is rotated a unit angle (for example, one degree) as described hereinbefore, if the number of the received pulses is counted, then it indicates the rotational angle of the permanent magnet 1. After a number of pulses corresponding to one complete rotation as indicated by $2\pi$ (radians) in FIG. 2(a) is thus counted, the count number is reset and a counting operation is re-started. Consequently, the rotational angle of the permanent magnet 1 from a predetermined reference position is always discriminated from the count number. The vector oscillation 16 has such a function as described just above and is constituted using a ring counter or the like. As apparent from the foregoing description, the output $e^{j\theta s}$ of the vector oscillator 16 is a signal of an angular component, and the angle $\theta_s$ of the permanent magnet 1 at the present point of time is a value which increases in proportion to the count number of the pulses.

The vector multiplier 17 receives and multiplies an output $\mathbb{I}_s$ of the vector converter 15 and the output $e^{j\theta s}$ of the angular component of the vector oscillator 16 and delivers a multiplied value $\mathbb{Z}$ therefrom. The multiplied value $\mathbb{Z}$ is represented by a following expression:

$$\mathbb{Z} = \mathbb{I}_s \cdot e^{j\theta s} \tag{1}$$

Since $\mathbb{I}_s = I_{rs}$ in a normal condition, $$\mathbb{Z} = I_{rs} \cdot e^{j\theta_s} \qquad (2)$$

is obtained.

FIG. 2(b) is a waveform diagram of the expression (2), and in FIG. 2(b), the axis of abscissa indicates the rotational angle $O_s$ and the axis of ordinate indicates a real number portion $\mathbb{Z}$ of the vector $\mathbb{Z}$. Now, if it is assumed that a pulse $P_s$ shown in FIG. 2(a) among output pulses of the pulse generator 10 is a pulse at the reference position, then the angle indicated by a long and short dash line is 0 ($\theta_s = 0$), and the output of the vector oscillator 16 is $e^{j\theta_s} = 1$. Accordingly, the output signal of the vector multiplier 17 at the reference position has a value $I_{rs}$. Then, as it is assumed that the pulse $P_s$ is a pulse at the reference position, the output signal of the vector multiplier 17 exhibits a cosine waveform having a maximum value of $I_{rs}$ as shown in FIG. 2(b).

The three-phase converter 18 receives the signal of such a waveform as shown in FIG. 2(b) and determines the signal as a signal u for a U phase current $I_U$ to be supplied to the armature winding 2U of the phase U. Thus, since the currents $I_V$ and $I_W$ of the other phases V and W have the same waveforms with respect to the current $I_U$ of the phase U and the three currents have a fixed phase relationship to one another, also a signal v for the current $I_V$ of the phase V and a signal w for the current $I_W$ of the phase W are determined decisively. This will be described with reference to the waveform diagrams shown in FIGS. 2(b), 2(c) and 2(d). Since the phase currents $I_U$, $I_V$ and $I_W$ of the phases U, V and W are three-phase ac currents, the V phase current $I_V$ lags the U phase current $I_U$ by a phase difference of $2\pi/3$ radians, and the W phase current $I_W$ lags the V phase current $I_V$ by a phase difference of further $2\pi/3$ radians. Accordingly, if the signal u is determined as a signal for the U phase current $I_U$, then the signals v and w are signals which have the same maximum value with and lag the signal u by phase differences of $2\pi/3$ radians and $4\pi/3$ radians, respectively. Thus, if the reference position of $\theta_s = 0$ is examined, then the value of the signal u at the position is $I_{rs}$ while the values of the signals v and w are both $-I_{rs}/2$. Accordingly, when the permanent magnet 1 is at the reference position, the three-phase converter 18 delivers the value $I_{rs}$ as a signal u, the value $-I_{rs}/2$ as a signal v and the value $-I_{rs}/2$ as a signal w. As the permanent magnet 1 is rotated to change its position, the long and short dash line indicated in FIGS. 2(a) to 2(d) moves in the rightward direction in the figures, and values at points at which the individual signal waveform curves cross the thus moved long and short dash line then are successively delivered as signals u, v and w from the three-phase converter 18.

If the rotational speed $N_M$ of the permanent magnet 1 changes, then the difference thereof from the reference speed $N_S$ changes so that the magnitude of the output signal $I_{rs}$ of the proportional amplifier 13 changes. Consequently, the signal waveforms of FIGS. 2(b) to 2(d) change, but the change is only a change in maximum value $I_{rs}$ while the phase relationship among the individual signal waveforms is maintained constant. The signals v and w according to such signal waveforms can be obtained by using a function generator having such waveform characteristics as shown in FIGS. 2(c) and 2(d) wherein the value $I_{rs}$ is used as a parameter. It is to be noted that, for the signal u, the input signal is used as it is.

The signals u, v and w delivered in this manner from the three-phase converter 18 are transmitted via the controllers 20u, 20v and 20w to the invertor controlling circuit 7 for the invertor device 8 so that the individual transistors Tr of the invertor circuit 6 is controlled in response to the signals u, v and w. As a result, currents $I_U$, $I_V$ and $I_W$ corresponding to the signals u, v and w are supplied to the individual armature windings 2U, 2V and 2W of the phases U, V and W, respectively, so that the permanent magnet synchronous motor M is driven. During such driving, the individual phase currents $I_u$, $I_V$ and $I_W$ are always detected by the current detectors 19U, 19V and 19W, respectively, and such detection signals are transmitted to the controllers 20u, 20v and 20w of the individual phases so that well known feedback control is effected for the individual phase currents.

Figure 3:
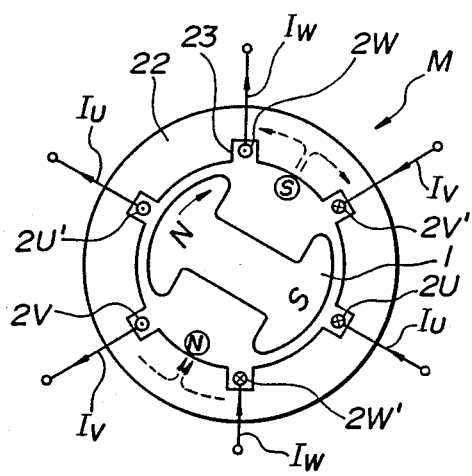
FIG. 3 is a schematic illustration showing the permanent magnet synchronous motor in a normal condition.

Here, a magnetic field formed while the permanent magnet 1 is driven by the control described above will be described. FIG. 3 is a schematic illustrative view of the permanent magnet synchronous motor M. Referring to FIG. 3, reference numeral 1 denotes a permanent magnet, reference numerals 2U and 2U' denote armature windings of the phase U, 2V and 2V' armature windings of the phase V, and 2W and 2W' armature windings of the phase W. Reference numeral 22 denotes a stator, and 23 a slot formed in the stator 22. The armature windings 2U to 2W' of the individual phases are received in the individual slots 23. In FIG. 3, each phase is shown having a pair of opposing slots in each of which a conductor is received, and an armature winding of each phase is composed of such a pair of conductors. The pair of opposing conductors are connected to each other on one end side of the permanent magnet synchronous motor M.

Here, if it is assumed that the position of the permanent magnet shown in FIG. 3 is the reference position ($\theta_s = 0$), a U phase current $I_U$ which increases in proportion to the signal u ($u = I_{rs}$) flows in the direction of arrow marks through the armature windings 2U and 2U' of the phase U, and a V phase current $I_V$ ($I_V = -I_U/2$) which increases in proportion to the signal v ($v = -I_{rs}/2$) flows in the direction of arrow marks through the armature windings 2V and 2V' of the phase V, and further a W phase current $I_W$ ($I_W = -I_U/2$) which increases in proportion to the signal w ($w = -I_{rs}/2$) flows in the direction of arrow marks through the armature windings 2W and 2W' of the phase W. With the individual phase currents $I_U$, $I_V$ and $I_W$, magnetic fields are generated by the armature windings 2U to 2W', and a composite magnetic field of them passes through the stator 22 as shown by broken lines. As the composite magnetic field is generated, such a condition that a north pole and a south pole are formed at such positions of the stator 22 as indicated by N and S in FIG. 3 occurs, and the north and south poles of the permanent magnet 1 are attracted respectively to the south and north poles formed in the stator 22 so that the permanent magnet 1 is rotated in the direction indicated by an arrow mark in FIG. 3.

In response to rotation of the permanent magnet 1, pulses are developed from the pulse generator 10 so that the output signal $e^{j\theta_s}$ of the vector oscillator 16 is changed. Consequently, the output signals u, v and w of the three-phase converter 18 are also changed and the three-phase currents $I_U$, $I_V$ and $I_W$ are changed. Together with this, the composite magnetic field formed in the stator 22 is also changed so that the magnetic poles N and S are moved in the same direction as the direction of rotation of the permanent magnet 1. Consequently, rotation of the permanent magnet 1 will be continued finally at a rotational speed substantially equal to the reference speed $N_S$.

During such operation as described above, if the condition at an instant when the composite magnetic field shown in FIG. 3 is formed in the stator 22 by the individual phase currents, the direction of the composite magnetic field and the direction of the magnetic field within the permanent magnet 1 have a mutually perpendicular relationship. Accordingly, the permanent magnet 1 will not be demagnetized at all by the composite magnetic field generated by the armature windings. Further, since the position of the permanent magnet 1 and the individual phase currents have such a fixed relationship as seen in FIGS. 2(a) to 2(d), the relationship described above between the permanent magnet 1 and the composite magnetic field are maintained with certainty during driving of the permanent magnet synchronous motor M, and the permanent magnet 1 will not be demagnetized at all.

In the foregoing, operation in a normal condition has been described wherein there is no significant difference between the rotational speed $N_M$ and the reference speed $N_S$ of the permanent magnet synchronous motor M and the output signal $I_{rs}$ of the proportional amplifier 13 is smaller than the predetermined value $I_{rsO}$. By the way, if the load to the permanent magnet synchronous motor M increases to an abnormal degree, the permanent magnet 1 is demagnetized remarkably, and in an extreme case, such a condition may occur that the permanent magnet 1 is demagnetized completely. Further, even if such a condition does not occur, natural demagnetization due to aging of the permanent magnet 1 occurs as described hereinabove. In such an instance, according to the present embodiment, a signal $I_{XS}$ is delivered from the function generator 14 in order to prevent such partial or complete demagnetization as described above. This will be described in the following.

Figure 4:
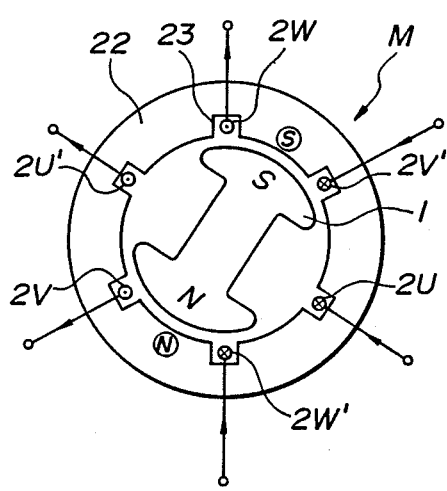
FIG. 4 is a similar view but showing the permanent magnet synchronous motor in an abnormal condition.

At first, a condition wherein partial or complete demagnetization of the permanent magnet occurs except due to natural demagnetization will be described with reference to the schematic illustrative view of the permanent magnet synchronous motor shown in FIG. 4. Here, it is assumed that the load to the permanent magnet synchronous motor M is an elevator. Generally, an elevator has such a construction wherein a cage is connected to an end of a wire while a weight connected is connected to the other end of the wire, and the wire is wound up by a winder which is driven by a motor. In the case of the present arrangement, such a permanent magnet synchronous motor as described above is used as the motor for the winder. By the way, when it is intended to move up the cage of the elevator, if the weight of the cage is excessively great, good balancing thereof with the weight is lost so that the cage will not be moved up, or in some cases, on the contrary the cage may be moved down a little and then stopped at the moved down position. The condition of the permanent magnet synchronous motor in such an instance is illustrated in FIG. 4 as it occurs when the permanent magnet 1 is at the reference position ($\theta_s=0$). Since the permanent magnet 1 is at the reference position, the individual phase current flows through the armature windings 2U to 2W' flow in the same directions as those in FIG. 3 so that the same magnetic poles N and S are formed in the stator 22. Meanwhile, if the cage is moved down a little as described hereinabove, the permanent magnet 1 is rotated in the direction opposite the direction indicated by the arrow mark in FIG. 3 until it is stopped substantially at the position shown in FIG. 4. In this condition, the composite magnetic field of the stator 22 has a direction opposite the internal magnetic field of the permanent magnet 1 and besides the individual phase currents are great and accordingly the composite magnetic field is great. In addition, the stopping time at the position is long. Consequently, the permanent magnet 1 will be demagnetized remarkably, and in an extreme case, the permanent magnet 1 may be demagnetized completely. While the description just above relates to an extreme example wherein the internal magnetic field of the permanent magnet 1 and the composite magnetic field generated in the stator 22 have the opposite directions, such an extreme case is not limited to this. For example, if the turning effect of the permanent magnet synchronous motor becomes short due to natural demagnetization of the permanent magnet 1, a step-out will take place. Accordingly, such a condition frequently occurs that the permanent magnet 1 assumes a particular position wherein it has a large component of the composite magnetic field in the opposite direction to that of the internal magnetic field thereof so that the permanent magnet 1 is demagnetized by the composite magnetic field.

When the permanent magnet synchronous motor M is in a condition wherein partial or complete demagnetization is to take place as described above, the rotational speed $N_M$ of the permanent magnet synchronous motor M becomes very low. Consequently, the output signal $I_{rs}$ of the proportional amplifier 13 shown in FIG. 1 becomes very great and now presents a value exceeding the predetermined value $I_{rsO}$. Accordingly, a signal $I_{XS}$ is developed from the function generator 14 in accordance with the characteristic of the function generator 14. The signal $I_{XS}$ is delivered to the vector invertor 15 in which it is converted into a vector together with the output signal $I_{rs}$ of the proportional amplifier 13. If the vector thus converted is represented by $\mathbb{I}_S$, then the vector $\mathbb{I}_S$ is represented by a following expression:

$$\mathbb{I}_S = I_{rs} + jI_{XS} \qquad (3)$$

In the expression (3) above, the values $I_{rs}$ and $I_{XS}$ are different in phase by 90 degrees from each other, and the value $I_{rs}$ constitutes a real number portion of the vector while the value $I_{XS}$ constitutes an imaginary number portion of the vector. Meanwhile, the vector $\mathbb{I}_S$ is a vector composite of the two values.

Here, if it is assumed that $$\mathbb{I}_S = \sqrt{I_{rs}^2 + I_{XS}^2}$$

$$\theta_S = \tan^{-1} \frac{I_{XS}}{I_{rs}}$$

then the expression (3) is rewritten as follows:

$$\mathbb{I}_S = I_S \cdot e^{j\theta_s} \qquad (4)$$

It is to be noted that, in such a normal condition of the permanent magnet synchronous motor M (wherein the value $I_{rs}$ is smaller than the predetermined value $I_{rsO}$) as described hereinabove, $\mathbb{I}_S = I_{rs}$ is obtained as described hereinabove because the value $I_{XS}$ *is equal to zero.*

In this manner, the vector $\mathbb{I}_S$ including an imaginary number portion is delivered to the vector multiplier 17 in which it is multiplied by the angle component $e^{j\theta s}$ delivered from the vector oscillator 16. Accordingly, the output signal $\mathbb{Z}$ of the vector multiplier 17 is represented by the following expression:

$$\mathbb{Z} = \mathbb{I}_S \cdot e^{j\theta s} \qquad (5)$$

By the way, the signal when the value $I_{rs}$ of a real number portion of the expression (5) above is multiplied by the angle component $e^{j\theta s}$ is the same as the output signal u of the three-phase converter 18 described hereinabove. Thus, a signal when the value $I_{XS}$ of an imaginary number portion of the expression (5) above is multiplied by the angle component $e^{j\theta s}$ will be described with reference to the waveform diagrams shown in FIGS. 5(a) and 5(b). Full line waveform curves shown in FIGS. 5(a) and 5(b) are the same waveform curves as the waveform curves shown in FIGS. 2(a) and 2(b), respectively, that is, the waveform curves of the real number portion. While also the imaginary number portion of the output $\mathbb{Z}$ of the vector multiplier 17 is delivered together with the real number portion of the same, the imaginary portion presets a waveform which lags the real number portion by a phase difference of $\pi/2$ and presents a maximum value of $I_{XS}$ as indicated in the expression (3) above. Such a waveform is shown by a broken line in FIG. 2(b). Accordingly, the output signal $\mathbb{Z}$ of the vector multiplier 17 is a composite (vector sum) of the waveforms of the real number portion and the imaginary number portion, and the signal $\mathbb{Z}$ is delivered as a signal u from the three-phase converter 18. In the present embodiment, however, the real number portion and the imaginary number portion of the signal $\mathbb{Z}$ are outputted independently of each other from the vector multiplier 17, and composition of them is made on the three-phase converter 18.

In the meantime, while signals v and w for the phases V and W are produced on the three-phase converter 18 in accordance with the real number portion of the signal $\mathbb{Z}$ as shown in FIGS. 2(c) and 2(d), imaginary number portions of the signals v and w are produced in a quite similar manner in accordance with the imaginary number portion of the signal $\mathbb{Z}$. In particular, solid line waveform curves shown in FIGS. 5(c) and 5(d) are signal waveform curves of the same real number portions as the waveform curves shown in FIGS. 2(c) and 2(d), respectively. The waveform curves of the imaginary number portions are waveform curves which lag the signal waveform curves of the respective real number portions by a phase difference of $\pi/2$ and have a maximum value of $I_{XS}$. Such signal waveforms can be obtained by using a function generator having such waveform characteristics as shown in FIGS. 5(c) and 5(d) wherein the value $I_{XS}$ is used as a parameter.

Here, similarly as in the case of $I_{XS} = 0$ described hereinabove, a magnetic field will be examined which is formed by signals of imaginary number portions (hereafter referred to as exciting signals) when the permanent magnet 1 is at the reference postion ($\theta_S = 0$). It is to be noted that, in the following description, it is assumed for convenience that the output signals u, v and w of the three-phase converter 18 only include exciting signal components. When $\theta_S = 0$, the signals u, v and w assume the values $u = 1$, $v = -3I_{XS}/2$ and $w = 3I_{XS}/2$ as shown in FIGS. 5(b) to 5(d) from the phase relationship to the real number portions. Accordingly, individual phase currents of the following values are outputted from the invertor device 8. In particular, the U phase current $I_U$ has a value 0, the V phase current $I_V$ has a value proportional to the signal $-3I_{XS}/2$, and the W phase current $I_W$ has a value proportional to the signal $3I_{XS}/2$. A magnetic field formed by the currents is illustrated in FIG. 6.

Figure 6:
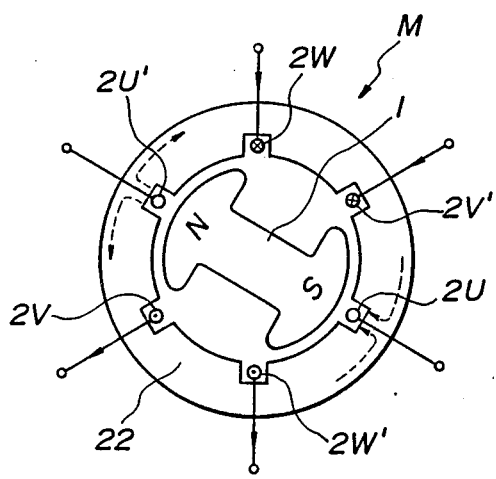
FIG. 6 is a view similar to FIGS. 3 and 4 but illustrating a magnetic field formed by electric currents of the waveforms shown in FIGS. 5(b) to 5(d)

Referring FIG. 6 which is a schematic illustrative view of the permanent magnet synchronous motor, magnetic fields formed by the individual phase currents are shown by broken lines. The directions of such magnetic fields coincide with the direction of an internal magnetic field of the permanent magnet 1 so that the magnetic fields act to magnetize the permanent magnet 1.

By the way, while such magnetic fields as described above are magnetic fields which are formed when it is assumed that the output signals u, v and w of the three-phase converter 18 only include exciting signal components, actually the signals u, v and w are signals composite of signals of real number portions and signals of imaginary number portions (exciting signals) as described hereinabove. It is to be noted that such composite signals u, v and w can be obtained by inputting outputs of an aforementioned function generator to which a real number is inputted and outputs of another function generator to which an imaginary number is inputted to adders for the individual phases in order to add them to each other. Since the signals u, v and w are composite signals in this manner, the individual phase currents are also composite currents which are produced in response to the composite signals. Consequently, the magnetic field generated in the permanent magnet synchronous motor M is a magnetic field composite of the magnetic field shown in FIG. 3 and the magnetic field shown in FIG. 6. It is a matter of course, however, that such magnetic field components as shown in FIG. 6 exist in the composite magnetic field, and it is also a matter of course that the permanent magnet 1 is magnetized by such magnetic field components. Further, it is apparent that the magnetic field components to magnetize the permanent magnet 1 in this manner are always generated irrespective of the position of the permanent magnet 1 where an imaginary number portion is included in the output signal $\mathbb{I}_S$ of the vector converter 15. The generation of an imaginary number portion current only when the difference between the rotational speed of a rotor and a reference speed exceeds a predetermined value makes it possible to avoid wasteful power consumption.

Meanwhile, even if it is assumed that the load to the permanent magnet synchronous motor M is an elevator and such a condition as shown in FIG. 4 occurs so that considerable demagnetization takes place with the permanent magnet 1, the turning effect will be decreased in operation of the permanent magnet synchronous motor M after then due to such demagnetization, and consequently a great exciting signal will be generated. Consequently, a magnetic field in such a magnetizing direction as described above is produced and compensates for such demagnetization. Accordingly, the elevator will finally have no trouble in operation.

Since in the present embodiment the position and the rotational speed of the permanent magnet are detected by the pulse generator and currents to be supplied to the armature windings are controlled in response to the thus detected position and rotational speed, a magnetic field generated during driving of the permanent magnet synchronous motor can be maintained in a direction substantially perpendicular to the direction of a magnetic field in the permanent magnet. Accordingly, demagnetization of the permanent magnet can be prevented, and incidentally the permanent magnet synchronous motor can be used with a high degree of reliability. Further, since, when such a condition that the permanent magnet is demagnetized so that the turning effect becomes short occurs so that the difference between the rotational speed and the reference speed becomes greater than the predetermined value, currents of the other components than the preceding currents are supplied to the armature windings together with the preceding currents in accordance with the difference, a magnetic field of a direction in which it acts to magnetize the permanent magnet can be generated. Consequently, demagnetization of the permanent magnet can be positively compensated for, and also from this point of view, the reliability of the permanent magnet synchronous motor can be improved.

It is to be noted that, while in the description of the embodiment the proportional amplifier 13, function generator 14, vector converter 15, vector oscillator 16, vector amplifier 17 and three-phase converter 18 are described as they are constituted from electric circuitry, apparently they can be constituted from a microcomputer.

Further, while in the description of the embodiment the example is described wherein a construction is provided which outputs a signal of an imaginary number to effect magnetization of the permanent magnet when the difference between the speed of the permanent magnet synchronous motor and the reference speed exceeds the predetermined value, such a construction is not always necessary, and even if the construction is not provided, demagnetization other than natural demagnetization of the permanent magnet can be prevented with certainty. Further, if necessary, means for stopping driving of the permanent magnet synchronous motor when the difference exceeds the predetermined value can be provided in place of the construction for effecting magnetization of the permanent magnet.

Further, while in the description of the embodiment the example wherein a pulse generator is used to detect the rotational position and the rotational speed of the permanent magnet is described, the rotational position and the rotational speed of the permanent magnet can be judged depending upon a back electromotive force detected which is generated in each of the armature windings in place of the pulse generator.

Accordingly, according to the first aspect of the present invention, since a rotational position and a rotational speed of a permanent magnet is detected and currents are supplied to armature windings in response to a difference between the rotational speed and a reference speed and also to the rotational position, the direction of a magnetic field generated in the permanent magnet synchronous motor can be directed substantially perpendicular to the direction of a magnetic field in the permanent magnet. Consequently, demagnetization of the permanent magnet can be prevented, and incidentally the permanent magnet synchronous motor can be used with a high degree of reliability.

Further, according to the second aspect of the present invention, since, in addition to the first aspect, a magnetic field component of the direction to magnetize the permanent magnet is generated when the difference between the rotational speed of the permanent magnet and the reference speed exceeds a predetermined value, demagnetization of the permanent magnet can be compensated for sufficiently, and the reliability of the permanent magnet synchronous motor can be improved remarkably.

What is claimed is:

1. A controlling device for a permanent magnet synchronous motor wherein a permanent magnet is used as a rotor and which includes three-phase armature windings, comprising a detecting means for detecting a rotational position and a rotational speed of said rotor, a comparison means for comparing the rotational speed detected by said detecting means with a predetermined reference speed and for developing a first value of a difference between the rotational speed and the reference speed, an exciting component generating means for developing a second value only when the first value of the difference exceeds a predetermined value, said second value being an exciting component value for generating in the respective three-phase armature windings exciting currents capable of producing magnetic field components in directions of magnetizing the permanent magnet, having a phase shift of 90 degrees with respect to the currents supplied to the armature windings and increasing or decreasing depending on an increase or decrease of the value of the difference, a converting means for determining currents to be supplied individually to said armature windings in response to a vector value obtained from the rotational position detected by said detecting means and the value of the difference delivered from said comparison means as well as to the rotational position and the exciting component value obtained by said exciting component generating means, and a current controlling means for controlling current flows through said individual armature windings in response to values obtained by said converting means.

2. A controlling device for a permanent magnet synchronous motor as claimed in claim 1, wherein said detecting means is a pulse generator coupled to said rotor.

3. A controlling device for a permanent magnet synchronous motor as claimed in claim 1, wherein said detecting means includes means for detecting a back electromotive force generated in each of said armature windings of the individual phases, and means for judging the rotational position and the rotational speed of said rotor in response to each of the detected back electromotive forces.

4. A controlling device for a permanent magnet synchronous motor as claimed in claim 1, wherein said comparison means is a proportional amplifier.

5. A controlling device for a permanent magnet synchronous motor as claimed in claim 1, wherein said comparison means is a proportional integrating amplifier.

6. A controlling device for a permanent magnet synchronous motor as claimed in claim 1, wherein said converting means is a means for detecting, as values of currents of the individual phases, composite values of values of such sine wave currents of the individual phases at the rotational position detected by said detecting means that have a maximum value which increases in proportion to the value of the difference obtained by said comparison means and values of such sine wave currents of the individual phases at the rotational position detected by said detecting means that have a maximum value equal to the exciting component value obtained by said exciting component generating means.

7. A controlling device for a permanent magnet synchronous motor as claimed in claim 1, wherein said current controlling means includes a rectifying means for rectifying an ac current, an invertor means for converting a dc current obtained by said rectifying means into three-phase ac currents, and a controlling means for controlling said invertor means in response to a value determined by said converting means.

8. A method for controlling a permanent magnet synchronous motor using a permanent magnet as a rotor and including three-phase armature windings, which comprises presetting a reference speed for the rotor, determining a value of difference between the reference speed and a rotational speed of the rotor, feeding the armature windings with currents corresponding to the value of difference respectively when the value of difference is not greater than a predetermined value, feeding exciting currents to the armature windings respectively only when the value of difference exceeds the predetermined value, said exciting currents having a phase shift of 90 degrees with respect to the currents supplied to the corresponding armature windings and increasing or decreasing depending on an increase or decrease of the value of difference, whereby magnetic field components in directions for magnetizing the permanent magnet are produced about the respective armature windings by the exciting currents.

* * * * *